Fig. 3.

May 19, 1936.  W. R. POSTLEWAITE  2,040,876
PIPE COATING APPARATUS
Filed July 30, 1932  6 Sheets—Sheet 4

Inventor
William R. Postlewaite
By Lyon & Lyon
Attorneys

May 19, 1936. W. R. POSTLEWAITE 2,040,876
PIPE COATING APPARATUS
Filed July 30, 1932 6 Sheets-Sheet 6

Fig. 9.

Inventor
William R. Postlewaite
By Lyon & Lyon
Attorneys

Patented May 19, 1936

2,040,876

UNITED STATES PATENT OFFICE 2,040,876

PIPE COATING APPARATUS

William R. Postlewaite, San Francisco, Calif., assignor to Standard Oil Company of California, San Francisco, Calif., a corporation of Delaware Application July 30, 1932, Serial No. 626,870

9 Claims. (Cl. 25—38)

My invention relates to pipe coating apparatus, and has particular reference to a device for applying a mastic wrapping or coating to a pipe. In the construction of underground conduits employing metallic pipe, it is desirable to coat the pipe with an insulating, acid and alkaline-resistant covering to prevent deterioration of the pipe, due to contact with the earth, and for this purpose it is the practice to apply a relatively thin wrapping, or coating, of suitable material about the exterior of the conduit. Such coatings usually comprise a mastic formed of bituminous material, which is applied to the pipe while in a plastic condition, and is permitted to harden upon the pipe. Various methods of applying such mastic coatings have been suggested, such as the wrapping of a helix of mastic fed to the pipe in the form of a substantially continuous ribbon, or the applying of a relatively thick layer of mastic to a paper wrapping which is then wrapped in a helix about the pipe.

All of the previous methods of applying coatings to pipe, however, are subject to disadvantages, particularly in view of the fact that the helix of plastic material is wrapped around the pipe with the sides of adjacent coils of the helix abutting each other so that if the wrapping is not carefully done spaces are left between adjacent coils of the helix. Moreover, the mass of mastic which is applied to the pipe is not compressed about the pipe, and, therefore, hardens into a relatively spongy mass, which does not adhere strongly to the pipe and which is mechanically weak.

It is, therefore, an object of my invention to provide a device for applying a dense mastic coating to pipes in which a continuous coating of mastic is formed upon the pipe without spaces therein.

Another object of my invention is to provide a device for applying mastic to pipe in which a relatively thick layer of mastic is applied to the pipe and then compressed or compacted upon the pipe to insure complete coverage of the pipe and to insure a solid, dense mass thereon.

Another object of the invention is to provide a device for applying mastic to pipes in which in a single operation the mastic is applied and compacted upon the pipe.

Another object of the invention is to provide a device for applying mastic to a pipe in which the mastic is applied as a continuous mass, as distinguished from a wrapping of the ribbon helix of mastic upon the pipe.

Another object of the invention is to provide a device for applying a coating of mastic to a pipe in which the device accurately follows the circumference of the pipe, irrespective of irregularities or bends which might occur in a length of pipe.

Another object of the invention is to provide a device for applying a coating of mastic to a pipe in which a relatively heavy coating of material is applied to the pipe and the coating is then drawn through a die to compress it into a solidly compacted mass.

Another object of the invention is to provide a device for applying a coating of mastic upon a pipe in which a supply of mastic is brought under pressure into contact with the pipe and is compressed in place to insure adherence of the mastic to the pipe and to insure a solidly compacted mass thereon.

Other objects and advantages will be apparent from a study of the following specifications, read in connection with the accompanying drawings, wherein.

Figure 1:
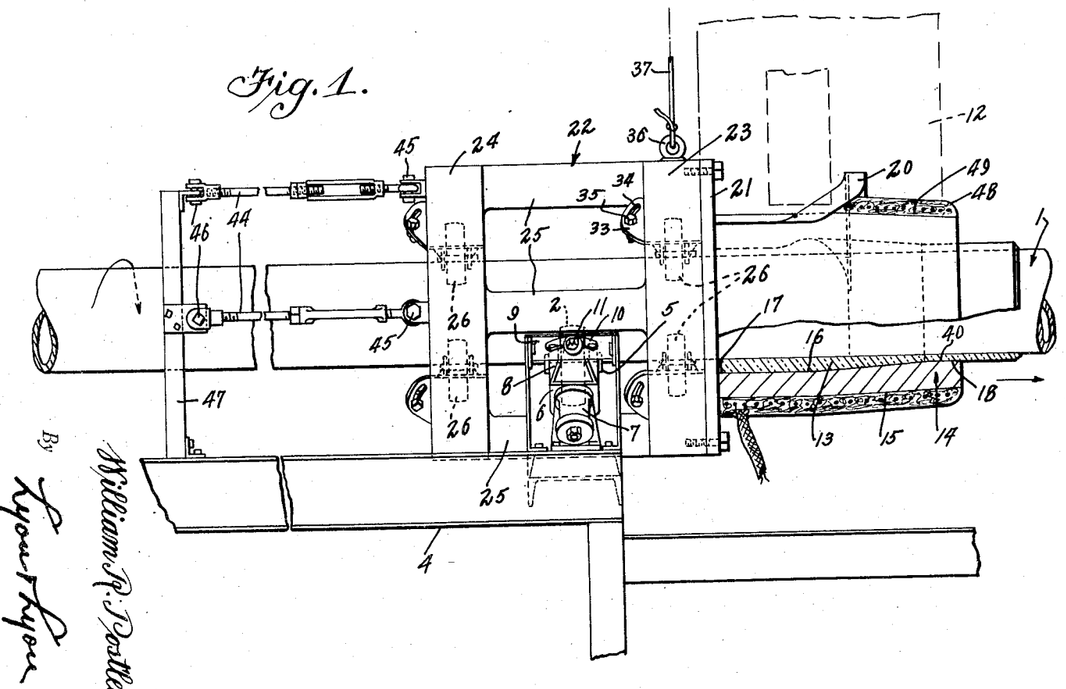
Figure 1 is a side elevational view of my mastic applying device arranged upon a pipe which is fed therethrough by a combined rotary and longitudinal motion.
Figures 2, 4:
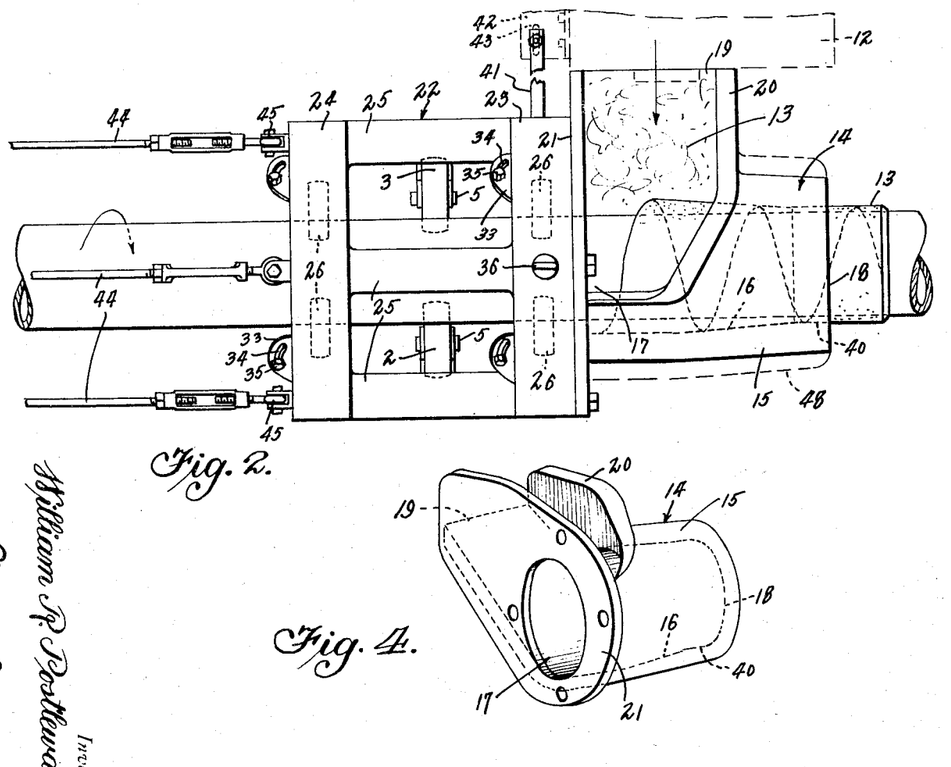
Figure 2 is a top plan view of the mastic applying device shown in Figure 1.
Figure 4 is a detail, perspective view of a nozzle employed in connection with my invention.
Figure 3:
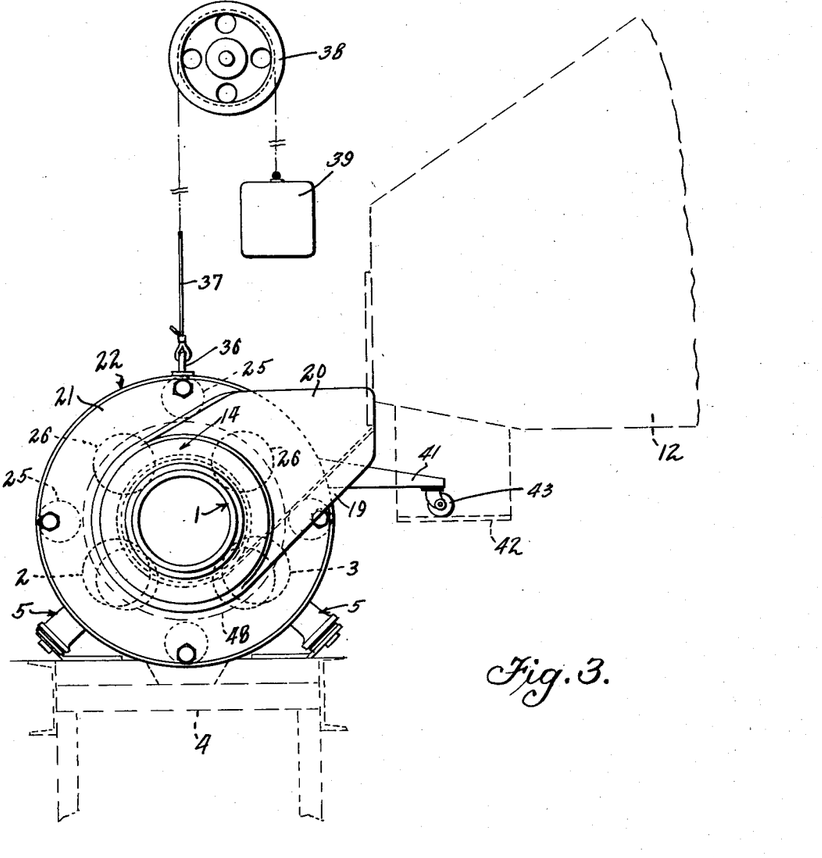
Figure 3 is an end elevational view of the mastic applying device shown in Figure 1.

Referring to the drawings, I have illustrated in Figures 1, 2 and 3, a pipe or tube 1 which is to be coated with the mastic. The pipe 1 is arranged to be rotated by any suitable driving mechanism, and while rotating, is given a longitudinal feeding motion so that any given point upon the surface of the pipe will be moved in such manner as to describe a helix. Such rotating and feeding movement may be provided by any suitable mechanism, such as that shown in the copending application of J. F. Putman, Serial No. 469,289, filed July 21, 1930, and assigned to the Standard Oil Company of California. Moreover, accuracy of the feed is not essential in my process, as distinguished from wrapping processes where an accurate feed must be maintained.

For purposes of illustration herein, I have illustrated the pipe 1 as being supported upon a pair of feeding rollers 2 and 3, mounted upon a suitable stationary framework 4 over which the pipe 1 is fed.

It will be understood by those skilled in the art that the rollers 2 and 3 rotate about the axes which are disposed at an angle to the axis of the pipe 1 so that as the pipe 1 is rotated, the peripheral contact between the roller 2 and the pipe, and the roller 3 and the pipe, will cause the pipe 1 to be moved longitudinally a selected distance for each revolution of the pipe 1.

For purposes of illustration, the roller 2 is shown as rotatable about a bearing 5 which is journaled in a bifurcated arm 6 rotatably mounted in a bearing 7, the axis of which is disposed radially relative to the pipe. The bifurcated arm 6 is provided with an outstanding bracket 8 which rests upon a plate 9 stationarily supported upon the supporting frame 4. The plate 9 is provided with an arcuate slot 10 through which a bolt 11 may pass, permitting the bracket 8 to be fixed in any desired position relative to the plate so that by rotating the arm 6 about its bearing 7 the axis of the roller may be disposed at any desired angle to the axis of the pipe.

For simplicity of illustration, the means for rotating the pipe is omitted, though it will be understood that any suitable chuck mechanism may be employed for producing a rotary motion of the pipe.

It will be understood by those skilled in the art that the support 4 and the feed rollers 2 and 3 are arranged to drive the pipe past a hopper 12 from which may be fed a suitable supply of the mastic material 13 to be applied to the pipe. The mastic is preferably maintained at relatively high temperature in order to maintain the same in a plastic condition, permitting it to be readily worked, and permitting it to attach itself to the pipe by adhesion.

It will also be understood by those skilled in the art that the pipe may equally well be rotated between head and tail stocks as in an ordinary lathe, while the feed is obtained by traversing the nozzle and hopper on a carriage.

The mastic 13 is fed from the hopper 12 into a mastic-applying nozzle 14 which is illustrated as comprising an annular cylindrical body portion 15 having a longitudinal bore 16 extending therethrough, through which the pipe 1 may pass. The bore 16 is illustrated as tapering from a large diameter at the entrance end 17 thereof to a smaller diameter at the exit end 18 thereof, so that when the nozzle is in place upon the pipe a relatively large space is provided between the periphery of the pipe and the internal periphery of the bore 16, as the pipe enters the nozzle, while a much smaller space is provided between the pipe and the interior of the nozzle as the pipe leaves the nozzle, to form a mastic smoothing and compacting die.

A portion of the side of the cylindrical section is open, the wall thereof extending tangentially to the bore 16 of the nozzle to provide a mastic feed chute 19 extending laterally from the bore to receive and direct mastic from the hopper to the bore 16.

The mastic chute 19 extends only partially along the longitudinal length of the nozzle 14, and a side wall 20 extends vertically from the chute to guide the flow of mastic into the bore 16. An attaching flange 21 is formed upon the entrance side of the nozzle 14 for the purpose of attaching the nozzle to a supporting mounting. The supporting mounting is illustrated as comprising a frame 22 formed of a pair of end rings 23 and 24 spaced from each other by suitable struts 25 in a longitudinal direction relative to the pipe. Each of the rings 23 and 24 is formed with the inner diameter considerably in excess of the diameter of the pipe which is to be treated, so as to provide a space therebetween in which contact rollers 26 may be mounted.

Figure 5:
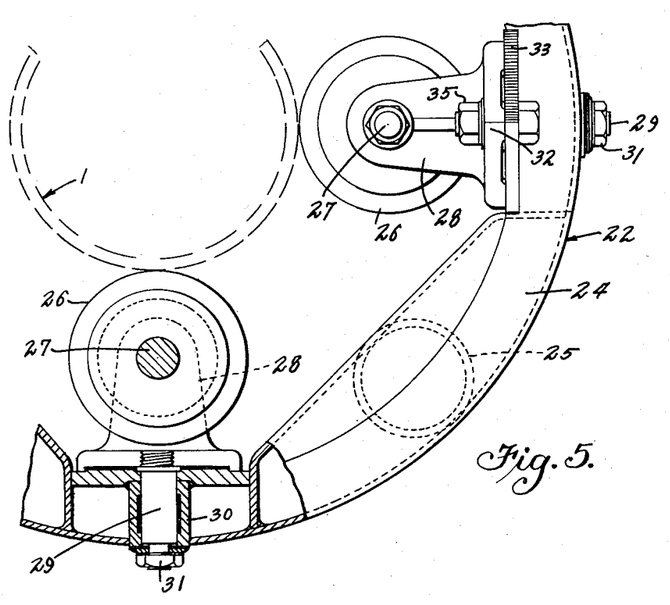
Figure 5 is a detail view, partly in section, of a nozzle mounting employed with my invention.
Figure 6:
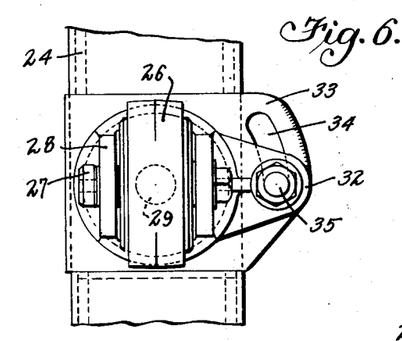
Figure 6 is a detail view of one of the rollers employed with the mounting shown in Figure 5.
Figure 7:
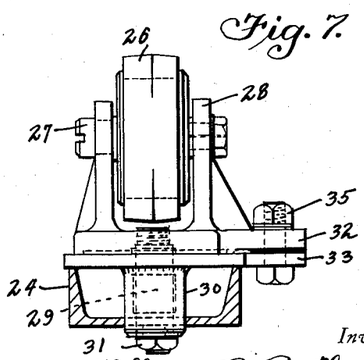
Figure 7 is a detail elevational view of the roller shown in Figure 6.

The contact rollers are illustrated particularly in Figures 5, 6, and 7, as being mounted upon suitable shafts 27 journaled in brackets 28, each of which is rigidly secured to a mounting pin 29 extending radially through the ring 24. A suitable bearing 30 may be formed in the ring 24 for the reception of the pin 29 so that the pin may readily rotate therein. The brackets 28 may be fixed to the ring by any suitable means, such as a nut 31, threaded upon the outer end of the pin.

The bracket 28 is illustrated as having a laterally extending lug 32 formed thereon to bear upon an adjusting plate 33 secured to the ring 24 and extending laterally beyond the edge of the ring. The adjusting plate 33 is provided with an arcuate slot 34 through which a bolt 35 may project to clamp the lug 32 in any desired position relative to the plate 33. Thus the lug 32 may be moved to rotate the bracket 28 to place the shaft or axis 27 of the roller at any desired angle to the axis of the pipe to be treated so that the axes of the rollers 26 may be disposed at the same angle relative to the axis of the pipe as is formed between the axes of the feed rollers 2 and 3. Thus as the pipe is fed longitudinally past the hopper 12, the frame 22 will remain stationary relative to the hopper.

It will be observed that the rings 23 and 24, with their associated rollers 26, are spaced a considerable distance longitudinally relative to the pipe so that a pair of spaced bearing supports is provided which will hold the attached nozzle substantially rigid in all directions transverse to the axis of the pipe. Preferably the length of the nozzle 14 and the distance of spacing from the rings 23 and 24 is relatively small, thus insuring that the nozzle 14 will be maintained concentric with the pipe by reason of maintaining the rings 23 and 24 concentric with the pipe. Thus slight bends which may occur in the pipe will not cause material deviation of the nozzle from the desired concentric position.

From the construction thus far described, it will be observed that the nozzle 14 is substantially floated upon the pipe 1, so that any deviation of the pipe from a true straight line will cause a corresponding deviation of the nozzle 14, maintaining the nozzle 14 and the pipe substantially concentric at all times. The weight of the frame 22 and the nozzle 14 may be partially or wholly supported by providing an eye-bolt 36 upon the ring 23 and attaching thereto a suitable cable 37 which passes over a supporting pulley 38 to a counterweight 39; thus no considerable strain is placed upon the pipe due to the weight of the nozzle and its mounting.

The operation of the device thus far described is as follows: A length of pipe to be treated is fed into the machine by passing the same through the frame 22 to the nozzle 14, after which the pipe may be set solid upon the frame 4 in contact with the feed rollers 2 and 3.

A rotary motion may be imparted to the pipe 1, as hereinbefore described, to cause it to traverse a substantially helical path through the nozzle 14. The mastic 13, which is supplied from the hopper 12 to the chute 19, will flow down the chute to the periphery of the rotating pipe and as the pipe rotates, the mastic will adhere to and be drawn around the periphery of the pipe 1.

It is desirable that a large quantity of mastic be exposed to the surface of the moving pipe at the throat of the chute 19. This will insure that sufficient mastic will be picked up and chilled to the surface of the pipe so that a continuous and uniformly dense coating will be obtained.

It will be observed, however, that the mastic is fed by the chute 19 into the bore 16 near the entrance end of the nozzle so that at this time a relatively thick mass of mastic is in contact with the periphery of the pipe. However, as the pipe continues to rotate, the coating of mastic which has been fed to and adheres to the pipe, is moved toward the reduced diameter end 18 of the bore 16 which compresses or coarcts the mass of mastic into intimate contact with the pipe and insures that the mastic will be compacted into a solid mass upon the pipe. Preferably the outermost end 40 of the bore 16 is formed parallel to the peripheral area of the pipe so that as the mastic passes this point it will be ironed out smoothly to insure a smooth exterior to the coating which has been applied to the pipe.

In order that there should be no gaps or voids in the coating, the longitudinal feed is preferably adjusted to a value less than the width of the mastic entrance chute 19 so as to compensate for disturbances in the feed and insure that every point of the pipe surfaces passes the full width of the application opening at least once. By shortening the pitch of the helical feed to one-half the chute width, each point on the pipe can be moved past the chute twice. This latter precaution is not normally required.

The mastic will provide considerable resistance to relative rotation of the pipe and the nozzle, which would create a tendency for the nozzle to rotate with the pipe, and to counteract this tendency, I provide a bar 41 upon the frame 22 extending laterally therefrom to engage a suitable stationary support 42. The contact between the bar 41 and the stationary support 42 is made through a roller 43, so that while the reaction forces necessary to counteract a tendency for the nozzle to rotate may be taken by the support 42, substantially little, or no, resistance is presented to lateral movement of the frame 22 to follow irregularities in the contour of the pipe. Another suitable method of taking the torque reaction of bar 41 would be to secure a cable to the end of bar 41, said cable to extend vertically upward a substantial distance, where the upper end is fastened to any suitable stationary support.

Also, the longitudinal drag between the pipe and the nozzle may be sufficient to overcome frictional engagement between the rollers 26 and the pipe so as to cause the frame and the nozzle to drift with the pipe. To insure against such occurrence, I prefer to provide a plurality of reins or links 44 which may be connected to the frame 22, as at 45, and also secured as at 46 to any suitable stationary support 47, illustrated herein as forming an extension of the main support or bed 4.

The apparatus described may be employed for applying different types of plastic materials. Some of them harden quickly with loss of temperature and tend to stick to cold surfaces. In order to prevent them from sticking to the nozzle 14, I find it desirable to provide it with an insulating jacket 48 and an electrical heating coil 49, or with other heating means so that the nozzle may be maintained slightly hotter than the plastic material being applied. This allows the nozzle to exert a very effective smoothing action.

The pipe being coated is ordinarily cold and the plastic material tends to adhere to it. This chilling-on action, together with the easy slipping of the tapered nozzle relative to the material, results in a powerful wire-drawing effect in which the coating is forced to shear itself backwards relative to the pipe and is simultaneously placed under powerful compression, which compacts it and causes it to adhere to the pipe with maximum tenacity.

It will be apparent that the apparatus as described functions primarily because of the selective adherence of the plastic material to the pipe rather than to the nozzle. With some types of material this effect, which can be promoted in various ways, as by having the nozzle smooth and the pipe rough or by the use of lubricants, is adequate; but other types of material are so stiff or so dry and mealy as to make it desirable to force them into the nozzle under pressure. As my nozzle surrounds the entire periphery of the pipe it is easily adapted to pressure operation. I may, therefore, enclose the entrance and apply a simple feeding worm or gear pump or other source of pressure to urge the mastic into the wedge-shaped space between the advancing pipe surface and the throat of the mastic chute. I have found that worm-type pumps are particularly adapted to the application of materials having considerable shearing strength and positive displacement types are most successful with more fluid materials.

Figure 10:
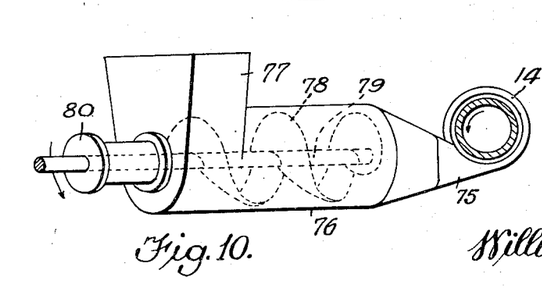
Fig. 10 is a detail view of a portion of a modified machine showing a screw or helix for feeding the mastic under pressure to the pipe.

One form of worm type pump that may be employed in the machine is disclosed in Fig. 10 in which the nozzle 14 is provided with a closed hopper 75 connected to one end of a feed cylinder 76, the opposite end of which opens into a hopper 77 to which the mastic is supplied. Mounted concentrically within the cylinder 76 is a screw or worm 78 which projects through the end of the hopper 77 and is rotatably supported in a suitable bearing member 80. The shaft 79 projects beyond the bearing member 80 as shown and may be rotated from any desired power source. In operation the worm 78 is rotated in the direction indicated by the arrow and continuously forces mastic from the hopper 77 to the nozzle 75, at which point it is delivered to the pipe tangentially, as previously described.

The use of any form of pump is not always desirable or necessary because of the entraining and drawing-in effect of the converging passage formed by the advancing surface of the helically moving pipe and the stationary bottom of the angularly and tangentially disposed mastic chute. I have found, however, that the mastic may be tamped into this opening by means of a mechanically operated reciprocating hammer or tamper which presses, or rather drives, the mastic into tight engagement with the pipe as the latter rotates past the entrance chute.

Figure 8:
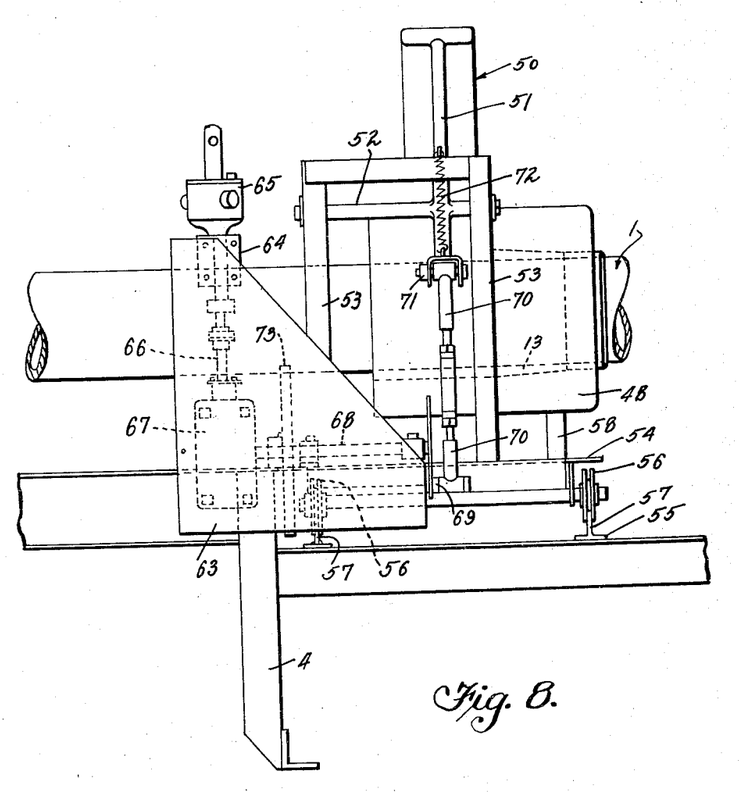
Figure 8 is a side elevational view of a nozzle constructed in accordance with my invention and associated with a tamper for compacting material upon the pipe.
Figure 9:
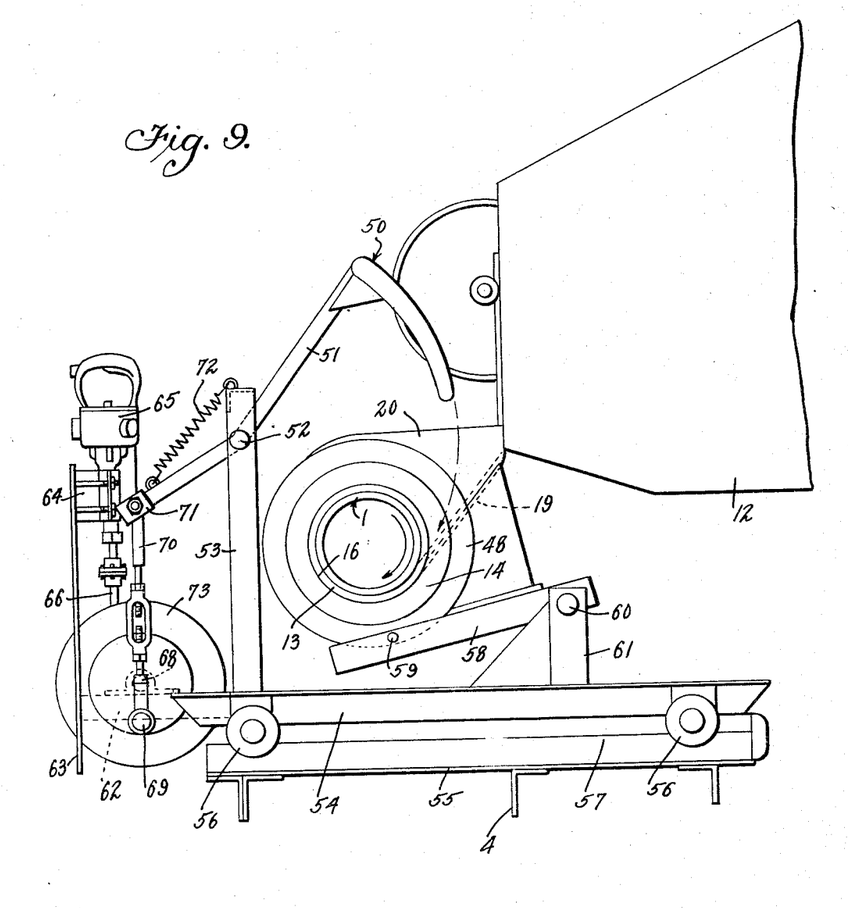
Figure 9 is an end view of the nozzle and compacting device shown in Figure 8.

Referring particularly to Figures 8 and 9, I have illustrated a tamper or pump which may be employed with my nozzle as hereinbefore described, the mastic pump comprising a plunger head 50 mounted upon the end of a lever 51. The lever 51 is pivoted at 52 to an upright 53 mounted upon a suitable carriage 54 which operates upon a bed 55 secured to the supporting framework 4 employed for supporting the pipe.

The carriage 54 is illustrated as being mounted upon a plurality of rollers 56 engaging rails 57 on the bed 55, so as to permit relatively free movement of the upright 53 and the plunger head 50 laterally with respect to the pipe. A hinged link 58 may be employed to interconnect the carriage 54 and the nozzle 14 so that lateral displacement of the nozzle, as bent portions of the pipe pass therethrough, will cause a similar lateral displacement of the carriage 54 to insure that the tamping head or plunger head 50 will maintain a predetermined relation relative to the pipe which is to be treated. The link 58 is illustrated as being pinned or otherwise fastened to the nozzle 14 by means of a loose pin 59. Preferably the link 58 is in the form of a lever pivoted at 60 to a bracket 61 formed rigidly upon the carriage 54.

An extension 62 of the carriage provides a suitable mounting for a source of motive power for the plunger head 50 and its operating lever 51, the mounting being illustrated as formed by an upright plate 63 secured to the extension 62 and having a clip or mounting bracket 64 thereon for receiving and gripping a motor 65. The motor is illustrated as being of the compressed air type, though it will be understood that any suitable source of motive power may be employed.

The shaft 66 of the motor 65 is illustrated as being connected to a suitable reduction gearing 67 to drive a shaft 68 upon which is mounted a crank 69 connected through a suitable connecting rod or link 70 to one end 71 of the lever 51. Hence rotation of the shaft 68 will cause a reciprocating movement of the lever 51, driving the plunger head 50 from the position spaced from the pipe, as shown in Figure 9, to a position within the entrance opening of the nozzle 14 to compress the mastic, which is entering the entrance chute 19 of the nozzle, tightly against the pipe.

It will be observed from an inspection of Figure 9 that the plunger head 50 is formed with an arcuate configuration which conforms with the arcuate path of movement of the plunger 50 so that at the point of contact or application of pressure between the plunger head 50 and the mastic, the movement of the plunger head will be substantially tangential to the periphery of the pipe. Thus, while the mastic may be fed into the entrance chute 19 by gravity, the operation of the plunger head 50 will be such as to drive the mastic into the nozzle and around the pipe at a considerable pressure.

Preferably the speed of operation of the plunger head 50 is that of about 150 to 200 strokes of the plunger head per minute, this arrangement insuring that the mastic will be squeezed into place around the entire periphery of the pipe, while the pipe is rotating. The spring 72 and flywheel 73 serve to store energy during the upstroke of plunger head 50 and subsequently deliver energy during the power stroke, thus providing more even torque and steadier operation.

It will be observed that the relatively large entrance opening to the nozzle 14 provided by the open entrance chute 19, permits the insertion of the plunger head 50 for compressing or forcing the incoming mastic against the pipe. Of course after the mastic has been squeezed into engagement with the pipe at the point of the largest space between the pipe and the nozzle, the helical movement of the pipe through the nozzle will cause the reduced portions of the bore 16 to compress the mastic further about the pipe and to iron out the surface of the mastic.

In this manner mastics which are relatively solid or stiff and dry in their composition may be readily applied to the pipe by employing the same nozzle which may be employed for coating pipes with a lighter and more plastic composition. It will also be observed that the tamping device in no way interferes with the normal operation of the mastic-applying nozzle so that a single nozzle is readily adapted for use with varying types of mastics which may be employed.

While I have illustrated and described the preferred embodiment of my invention, I do not desire to be limited to any of the details of construction shown or described herein, except as defined in the appended claims.

I claim:

1. In a device for applying a coating of hot mastic to cold pipes, a nozzle having a longitudinal bore extending therethrough through which a pipe may pass, a mastic entrance chute communicating with the bore of said nozzle tangential to the periphery of said bore, and means for rotating said pipe and for longitudinally feeding the same relative to said nozzle.

2. In a device for feeding mastic to a pipe, a nozzle having a longitudinal bore extending therethrough through which a pipe may pass, a mastic chute communicating with said nozzle tangentially to the interior of said bore, the bore of said nozzle being tapered toward the pipe in the direction of movement of the pipe through the nozzle, the tangency of said chute and the taper of said bore cooperating with the motion of said pipe to compress the mastic on said pipe.

3. In a device for applying a mastic coating to pipes, a die nozzle having a longitudinal bore extending therethrough through which a pipe may pass, said bore being of greater diameter than the outside diameter of said pipe, means for rotating said pipe relative to said nozzle and for feeding the same longitudinally relative to said nozzle, said bore tapering from a larger diameter at the entrance for said pipe to a smaller diameter at the point of exit of said pipe, means for supporting said nozzle with the bore thereof concentric with said pipe, and a mastic chute in said nozzle communicating with the bore at the larger end thereof and in a direction tangential to the interior of said bore.

4. In a device for applying a mastic coating to pipes, a nozzle having a longitudinal bore extending therethrough through which a pipe may pass, means for supporting said nozzle with the bore thereof concentric with the pipe, a mastic entrance opening communicating with said bore along the line tangential to the internal periphery of said bore, and power-actuated tamping means reciprocating in said entrance opening in a direction tangential to said bore for compacting mastic between said pipe and said bore.

5. In a device for applying a mastic coating to pipes, a nozzle having a longitudinal bore extending therethrough through which a pipe may pass, means for supporting said nozzle with the bore thereof concentric with the pipe, a mastic entrance opening communicating with said bore along the line tangential to the internal periphery of said bore, a tamper comprising a head mounted for movement substantially tangential to said bore and insertable through said entrance opening, and means supporting said tamper and mounting means for lateral movement with said nozzle to maintain the point of contact of said tamper with the mastic along said tangential line independent of lateral movement of said nozzle due to irregularities in said pipe.

6. In a device for applying a mastic coating to pipes, a means extending at least partially around and spaced from said pipe means to guide mastic into direct contact with said pipe, and means communicating with the space between said first named means and said pipe for forcing said mastic into said space under pressure.

7. In a device for applying a mastic coating to pipes, a nozzle having a longitudinal bore extending therethrough through which a pipe may pass, means for supporting said nozzle with the bore thereof concentric with the pipe, a mastic entrance opening communicating with said bore along the line tangential to the internal periphery of said bore, and means for applying compressive force to said mastic in a direction tangential to said bore for compacting mastic between said pipe and said bore.

8. In a device for applying a mastic coating to pipe and the like, a nozzle having a longitudinal bore through which a pipe may pass, means for supporting said nozzle with the bore thereof concentric with the pipe, a mastic inlet communicating with said bore along the line substantially tangential to the inner periphery of said bore, and a screw feed means discharging into said mastic inlet for compacting mastic between said pipe and said bore, the tangency of said inlet with the bore of said nozzle cooperating to increase the compaction of said mastic on said pipe.

9. In a device for applying a mastic coating to pipe and the like, a nozzle having a longitudinal bore through which a pipe may be rotated, the outlet of said bore being of a greater diameter than the outside diameter of said pipe, a tangentially disposed mastic conduit communicating with said bore and extending longitudinally of said nozzle, and screw feed means discharging into said mastic inlet for compressing mastic into the converging space between the advancing surface of said pipe and the outer wall of said conduit, the tangency of said conduit with the bore of said nozzle cooperating with the rotation of said pipe to further compress the mastic on said pipe.

WILLIAM R. POSTLEWAITE.